US012607771B2

(12) United States Patent
Akhalwaya et al.

(10) Patent No.: US 12,607,771 B2
(45) Date of Patent: Apr. 21, 2026

(54) DYNAMICALLY FORECASTING HIGH RESOLUTION AIR TEMPERATURE IN REAL-TIME USING MULTIPLE SOURCES

(71) Applicant: International Business Machines Corporation, Armonk, NY (US)

(72) Inventors: Ismail Yunus Akhalwaya, Johannesburg (ZA); Etienne Eben Vos, Johannesburg (ZA); Sibusisiwe Audrey Makhanya, Pretoria (ZA); Tamara Rosemary Govindasamy, Cape Town (ZA); Zubeida Patel, Cape Town (ZA); Dedricks Monyai Morake, Pretoria (ZA); Craig Mahlasi, Johannesburg (ZA); Muaaz Bhamjee, Johannesburg (ZA)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 18/200,050

(22) Filed: May 22, 2023

(65) Prior Publication Data

US 2024/0393498 A1     Nov. 28, 2024

(51) Int. Cl.
| | |
|---|---|
| *G01W 1/10* | (2006.01) |
| *G06T 3/4046* | (2024.01) |
| *G06T 11/26* | (2026.01) |

(52) U.S. Cl.
CPC .............. *G01W 1/10* (2013.01); *G06T 3/4046* (2013.01); *G06T 11/26* (2026.01)

(58) Field of Classification Search
CPC ........ G01W 1/10; G06F 18/214; G06F 18/24; G06F 16/2474; G06F 18/2136;

(Continued)

(56) References Cited

U.S. PATENT DOCUMENTS

| | | |
|---|---|---|
| 7,027,834 B2 | 4/2006 | Soini et al. |
| 7,200,491 B1 | 4/2007 | Rose, Jr. et al. |

(Continued)

FOREIGN PATENT DOCUMENTS

| | | |
|---|---|---|
| CN | 112734648 A | 4/2021 |
| ZA | 2023/09448 B | 7/2024 |

OTHER PUBLICATIONS

K. Kashinath et al., "Physics-informed machine learning: case studies for weather and climate modelling," Philosophical Transactions R. Soc. A 379: 20200093 (Feb. 2021) (36 pages).

(Continued)

*Primary Examiner* — Catherine T. Rastovski
*Assistant Examiner* — Eric Sebastian Von Wald
(74) *Attorney, Agent, or Firm* — Tihon Poltavets

(57) ABSTRACT

Techniques for dynamically forecasting high spatial resolution air temperature in real-time using a multiplicity of data sources and advanced machine learning models are provided. In one aspect, a system for generating air temperature forecasts includes: a spatial downscaling module for providing air temperature data from a multiplicity of sources as input to a generative adversarial network, conditioning the input to the generative adversarial network on at least one conditioning variable, and generating high resolution air temperature maps; and a temporal forecasting module for providing the high resolution air temperature maps along with real-time air temperature data from a sensor network as input to a physics-informed neural network with extended Kalman filter, and generating high temporal and spatial resolution air temperature forecasts. A method for generating air temperature forecasts using the present system is also provided.

19 Claims, 9 Drawing Sheets

(58) Field of Classification Search
CPC .. G06F 18/2148; G06F 2218/08; G06F 17/18;
G06F 30/27; G06N 3/045; G06N 3/0475;
G06N 3/08; G06N 3/088; G06N 3/094;
G06N 3/048; G06N 3/084; G06N 20/10;
G06N 3/04; G06N 3/0455; G06Q 10/04;
G06T 3/4046; G06T 3/4053; G06T 3/40;
G06T 11/206; G06T 2207/10004; G06T
2207/20081; G06T 2207/20084; G06T
5/50; H04L 41/145
See application file for complete search history.

(56) References Cited

U.S. PATENT DOCUMENTS

| | | | | |
|---|---|---|---|---|
| 9,876,890 | B2 | 1/2018 | Shi et al. | |
| 10,036,671 | B2 | 7/2018 | Phan Le et al. | |
| 10,197,706 | B1 * | 2/2019 | Cai | G01W 1/10 |
| 11,734,798 | B2 * | 8/2023 | Shpalensky | G06T 7/70 |
| | | | | 348/157 |
| 2008/0096609 | A1 | 4/2008 | Lam et al. | |
| 2014/0188287 | A1 | 7/2014 | Sabata | |
| 2017/0256033 | A1 * | 9/2017 | Tuzel | G06F 18/214 |
| 2021/0041598 | A1 | 2/2021 | Tocornal et al. | |
| 2021/0064802 | A1 | 3/2021 | Albert et al. | |
| 2022/0035073 | A1 | 2/2022 | Mehtab et al. | |
| 2022/0113448 | A1 * | 4/2022 | Watson | G06N 3/084 |
| 2023/0010164 | A1 * | 1/2023 | Cowan | G06F 18/251 |
| 2023/0143145 | A1 * | 5/2023 | Price | G06N 3/047 |
| | | | | 706/21 |
| 2023/0152487 | A1 * | 5/2023 | Erinjippurath | G06N 20/00 |
| | | | | 702/3 |
| 2023/0244191 | A1 * | 8/2023 | Honkote | G05B 13/0265 |
| | | | | 700/47 |

OTHER PUBLICATIONS

Kun Song et al., "Potential Application of Using Smartphone Sensor for Estimating Air Temperature: Experimental Study," IEEE Internet of Things Journal, vol. 9, No. 16 (Aug. 2022) (8 pages).

American Geophysical Union, "Crowdsourcing weather using smartphone batteries," ScienceDaily, Aug. 2013 (3 pages).

Zander S. Venter et al., "Hyperlocal mapping of urban air temperature using remote sensing and crowdsourced weather data," Remote Sensing of Environment 242 (Mar. 2020) (14 pages).

Linwei Chen et al., "DeepUrbanDownscale: A physics informed deep learning framework for high-resolution urban surface temperature estimation via 3D point clouds," International Journal of Applied Earth Observations and Geoinformation 106 (2022) (published Dec. 2021).

Shengze Cai et al., "Physics-Informed Neural Networks for Heat Transfer Problems," ASME Journal of Heat Transfer, vol. 143 (Jun. 2021) (15 pages).

Yuxin Meng et al., "Physics-Guided Generative Adversarial Networks for Sea Subsurface Temperature Prediction," arXiv:2111.03064v1 (Nov. 2021) (13 pages).

Jochen Stiasny et al., "Physics-Informed Neural Networks for Non-linear System Identification for Power System Dynamics," arXiv:2004.04026v2 (Apr. 2021) (6 pages).

Alexandra Puchko et al., "DeepClimGAN: A High-Resolution Climate Data Generator," arXiv:2011.11705v1 (Nov. 2020) (5 pages).

Erik Kusch et al., "KrigR—a tool for downloading and statistically downscaling climate reanalysis data," Environ. Res. Lett. 17 (Jan. 2022) (10 pages).

Zongyi Li et al., "Neural Operator: Graph Kernel Network for Partial Differential Equations," arXiv:2003.03485v1 (Mar. 2020) (21 pages).

Zongyi Li et al., "Fourier Neural Operator for Parametric Partial Differential Equations," arXiv:2010.08895v3 (May 2021) (16 pages).

* cited by examiner

100

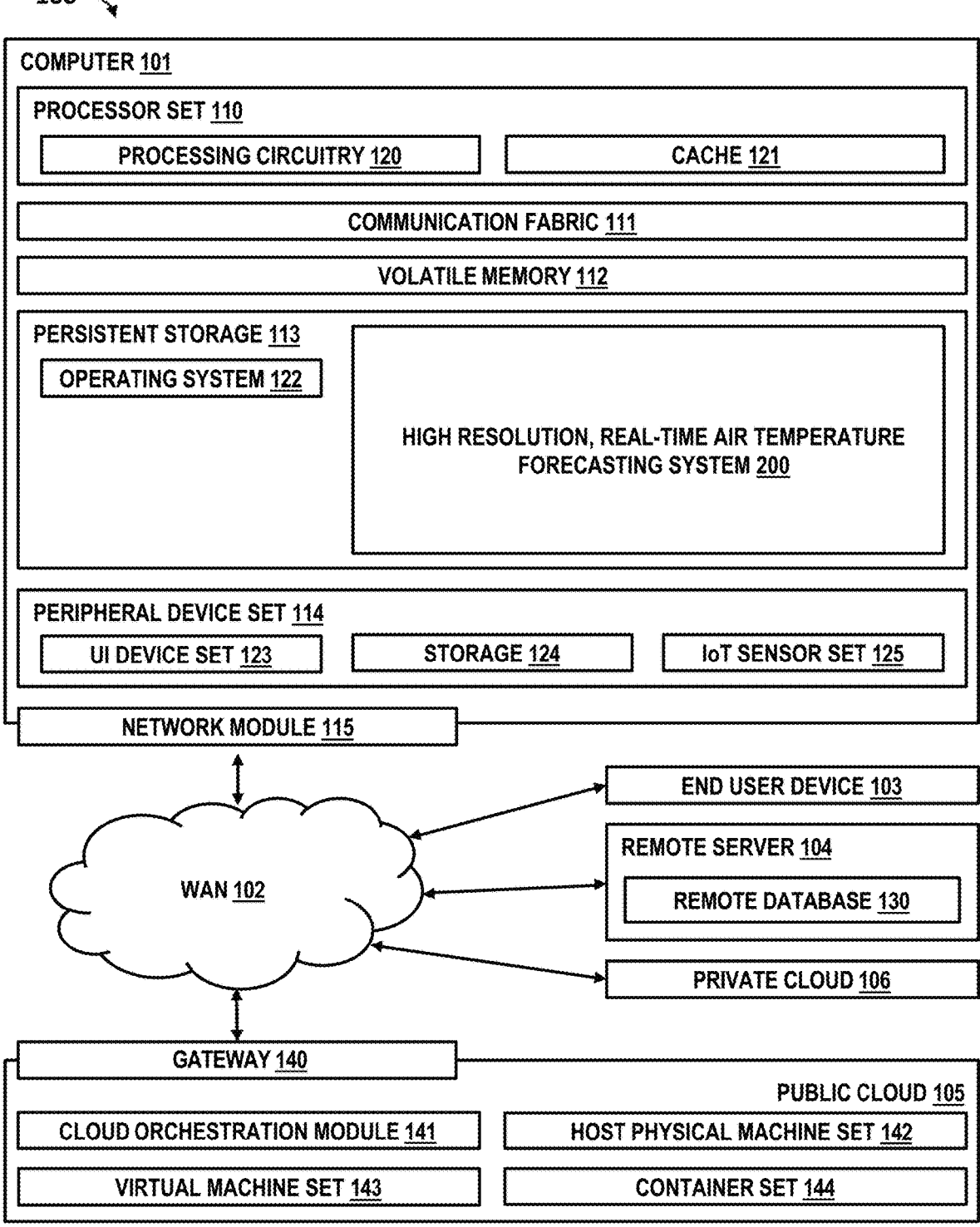

COMPUTER 101

PROCESSOR SET 110

PROCESSING CIRCUITRY 120   CACHE 121

COMMUNICATION FABRIC 111

VOLATILE MEMORY 112

PERSISTENT STORAGE 113

OPERATING SYSTEM 122

HIGH RESOLUTION, REAL-TIME AIR TEMPERATURE FORECASTING SYSTEM 200

PERIPHERAL DEVICE SET 114

UI DEVICE SET 123   STORAGE 124   IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141   HOST PHYSICAL MACHINE SET 142

VIRTUAL MACHINE SET 143   CONTAINER SET 144

Input variables (historic, hourly timeseries)

602

LR reanalysis/observations:
ERA5 Land (9 × 9km)

Covariates: LC, DEM, LST
(1 × 1km, 30 × 30m)

404

506

Generator

Discriminator

508

606

Generated data
HR t2m map
(100 ×100m)

Real Data

604

HR
UCM corrected data
(100 × 100m)

Interpolated station
and sensor data to
correct UCM

406

Samples come from hourly data / nearest available timestamp

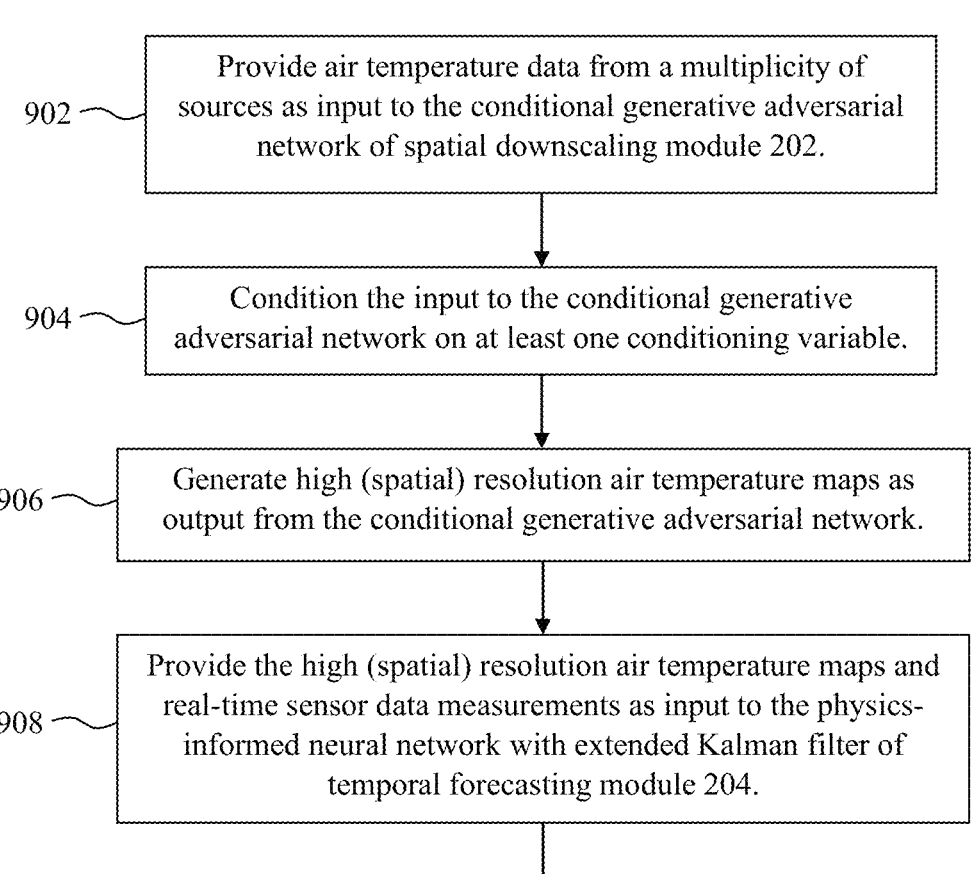

900

902 — Provide air temperature data from a multiplicity of sources as input to the conditional generative adversarial network of spatial downscaling module 202.

904 — Condition the input to the conditional generative adversarial network on at least one conditioning variable.

906 — Generate high (spatial) resolution air temperature maps as output from the conditional generative adversarial network.

908 — Provide the high (spatial) resolution air temperature maps and real-time sensor data measurements as input to the physics-informed neural network with extended Kalman filter of temporal forecasting module 204.

910 — Generate high temporal and spatial resolution air temperature forecasts as output from the physics-informed neural network with extended Kalman filter.

FIG. 9

DYNAMICALLY FORECASTING HIGH RESOLUTION AIR TEMPERATURE IN REAL-TIME USING MULTIPLE SOURCES

FIELD OF THE INVENTION

The present invention relates to air temperature forecasting, and more particularly, to techniques for dynamically forecasting high spatial resolution air temperature in real-time using a multiplicity of data sources and advanced machine learning models.

BACKGROUND OF THE INVENTION

Urban-scale air temperature data is important for a number of different use-cases and industries such as health monitoring, urban planning and agriculture. However, real-time air temperature forecasts are not readily available at this spatial scale.

Namely, global climate models (GCMs) produce air temperature estimates at a spatial resolution of 10 kilometers to 100 kilometers, and are issued for intervals between 1-46 days. While downscaling techniques can be implemented to process these products to a higher spatial resolution, they are still low on a temporal scale.

Records of historic air temperature data may be sourced from weather stations and satellite imagery. However, weather stations are sparsely located resulting in significant gaps in spatial coverage. Furthermore, their records are often inconsistent as most weather stations are not regularly maintained, especially those in remote locations. As compared to forecast data, satellite imagery is available at a higher spatial scale (e.g., about 1 kilometer). On a temporal scale, however, satellite imagery is only available at a 1-16 day revisit period, and often requires image processing which further delays availability of the data.

SUMMARY OF THE INVENTION

The present invention provides techniques for dynamically forecasting high spatial resolution air temperature in real-time using a multiplicity of data sources and advanced machine learning models. In one aspect of the invention, a system for generating air temperature forecasts is provided. The system includes: a spatial downscaling module for providing air temperature data from a multiplicity of sources as input to a generative adversarial network, conditioning the input to the generative adversarial network on at least one conditioning variable, and generating high resolution air temperature maps as output from the generative adversarial network, where the high resolution air temperature maps are generated at a higher spatial resolution than the air temperature data from the multiplicity of sources; and a temporal forecasting module for providing the high resolution air temperature maps along with real-time air temperature data from a sensor network as input to a physics-informed neural network with extended Kalman filter, and generating high temporal and spatial resolution air temperature forecasts as output from the physics-informed neural network with the extended Kalman filter.

The multiplicity of sources can include global climate model forecasts, regional climate model forecasts, urban climate model datasets, and combinations thereof. The at least one conditioning variable can be obtained from a dataset including a satellite imagery dataset, a land cover dataset, an elevation dataset, and combinations thereof.

Advantageously, by combining outputs from the spatial downscaling module and the temporal forecasting module the high temporal and spatial resolution air temperature forecasts can be generated both at real-time (t) or near real-time (i.e., with a delay in the real-time (t) of less than about 15 minutes) and at a spatial resolution of 100 meters× 100 meters or finer. This is also referred to herein as an urban-scale resolution. Further, the extended Kalman filter can be used to introduce an innovation term to a loss function of the physics-informed neural network which is computed by a state mean and Kalman gain.

In another aspect of the invention, another system for generating air temperature forecasts is provided. The system includes: a spatial downscaling module for providing air temperature data from a multiplicity of sources as input to a generative adversarial network, conditioning the input to the generative adversarial network on at least one conditioning variable, and generating high resolution air temperature maps having a spatial resolution of 100 meters×100 meters or finer as output from the generative adversarial network, where the high resolution air temperature maps are generated at a higher spatial resolution than the air temperature data from the multiplicity of sources; and a temporal forecasting module for providing the high resolution air temperature maps along with real-time air temperature data from a sensor network as input to a physics-informed neural network with extended Kalman filter, and generating high temporal and spatial resolution air temperature forecasts as output from the physics-informed neural network with the extended Kalman filter, where a loss function of the physics-informed neural network computes loss L as $L=L_b+L_o+L_e+L_i$, where $L_e$ is a residual loss, $L_b$ is a boundary condition loss, $L_o$ is an initial condition loss, and $L_i$ is a loss term defined by a state mean and Kalman gain in the extended Kalman filter.

In yet another aspect of the invention, a method for generating air temperature forecasts is provided. The method includes: providing air temperature data from a multiplicity of sources as input to a generative adversarial network; conditioning the input to the generative adversarial network on at least one conditioning variable; generating high resolution air temperature maps having a spatial resolution of 100 meters×100 meters or finer as output from the generative adversarial network, where the high resolution air temperature maps are generated at a higher spatial resolution than the air temperature data from the multiplicity of sources; providing the high resolution air temperature maps along with real-time air temperature data from a sensor network as input to a physics-informed neural network with extended Kalman filter; and generating high temporal and spatial resolution air temperature forecasts as output from the physics-informed neural network with the extended Kalman filter.

In an illustrative embodiment, the generative adversarial network has a generator sub-model and a discriminator sub-model, and the method further includes: generating the high resolution air temperature maps using the generator sub-model; and feeding the high resolution air temperature maps to the discriminator sub-model along with urban climate model datasets which are corrected using the real-time air temperature data from the sensor network. By way of example only, the urban climate model datasets can have a spatial resolution of 100 meters×100 meters or coarser.

A more complete understanding of the present invention, as well as further features and advantages of the present invention, will be obtained by reference to the following detailed description and drawings.

BRIEF DESCRIPTION OF THE DRAWINGS

FIG. 1 is a diagram illustrating an exemplary computing environment according to an embodiment of the present invention;

FIG. 9 is a diagram illustrating an exemplary methodology for generating air temperature forecasts using the present high resolution, real-time air temperature forecasting system according to an embodiment of the present invention.

DETAILED DESCRIPTION OF PREFERRED EMBODIMENTS

Figure 2:
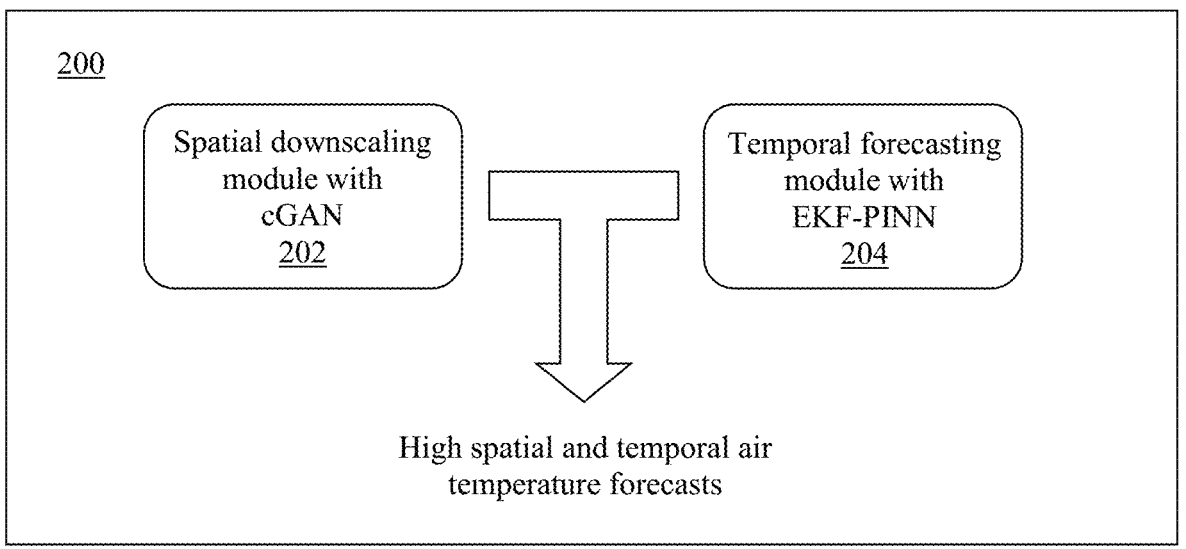
FIG. 2 is a diagram illustrating an exemplary high resolution, real-time air temperature forecasting system according to an embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as high resolution, real-time air temperature forecasting system 200. In addition to system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in system 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in system 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As described above, conventional forecasting methods do not provide an efficient and effective means for generating the real-time, urban-scale air temperature forecasts essential for a variety of use-cases and industries such as health monitoring, urban planning and agriculture. The term 'urban-scale,' as used herein, refers to a spatial resolution of less than or equal to 100 meters×100 meters, for example, a spatial resolution of from 10 meters×10 meters to 100 meters×100 meters, and ranges therebetween. In general, the term 'spatial resolution,' as used herein, refers to the size of the ground surface measured and/or observed by the technology. As such, a smaller ground surface measurement corresponds to a higher spatial resolution, and vice versa. Accordingly, a spatial resolution of 10 meters×10 meters is finer than a spatial resolution of 100 meters×100 meters, and conversely a spatial resolution of 100 meters×100 meters is coarser than a spatial resolution of 10 meters×10 meters. While global climate models (GCMs) (e.g., at a spatial resolution of from 10 kilometers×10 kilometers to 100 kilometers×100 kilometers) and downscaling techniques can be implemented to achieve a higher spatial resolution, the forecasts are still low from a temporal perspective. Simply put, with current approaches, generating urban-level air temperature maps takes a long time, often with a forecast issue frequency of a day, or even longer.

However, many applications require real-time or near real-time air-temperature forecasts. The term 'real-time,' as used herein, refers to the actual time (t) during which something takes place (i.e., instant), and the term 'near real-time,' as used herein, refers to a delay in real-time (t) of less than about 15 minutes, for example, from about 5 seconds to about 15 minutes. Take for instance the case of air temperature monitoring for agriculture. Even if achieved at an appropriate spatial resolution, knowing what the air temperature was a day or more in the past is not useful in determining current irrigation needs for crop growth.

Advantageously, the present system 200 provide a means for obtaining real-time or near real-time air temperature forecasts at a high (e.g., urban-scale) spatial resolution using advanced machine learning models such as conditional generative adversarial networks (or cGANs for short) and physics-informed neural networks (or PINNs for short). As will be described in detail below, the conditional generative adversarial network is conditioned on land cover classification, elevation, and satellite imagery. Urban scale climate models (or UCMs for short) are leveraged to improve the spatial resolution of the forecasts. Urban scale climate models generally require a lot of time and computational resources to simulate urban-level maps of climate variables, and as such, they are not able to operate in real-time. However, in accordance with the present techniques, to overcome this hurdle the urban scale climate models are corrected/validated in real-time or near real-time using sensor network data. As will be described in detail below, system 200 also includes an extended Kalman filter (or EKF for short) to inform the loss function and boundary conditions of the physics-informed neural network. The models are trained on high spatial resolution air temperature data which is available at a daily or even hourly interval and, as provided above, are further corrected/validated by the sensor network data and extended Kalman filter. It is notable, however, that even though high spatial resolution air temperature data may be available at an hourly interval, the fact that it is training data means that it produces a reanalysis or forecast data generated in the past. It is not possible to easily produce a forecast using a large numerical model for a large region of interest for, e.g., the next hour, at this given instant in time.

For instance, referring to FIG. 2, an exemplary configuration of system 200 is provided. As shown in FIG. 2, embodiments are contemplated herein where system 200 differentiates the spatial downscaling and temporal forecasting components and then logically integrates both components to provide real-time or near real-time air temperature forecasts at a high (e.g., urban-scale) spatial resolution. Specifically, according to an exemplary embodiment, system 200 includes a spatial downscaling module 202 and a temporal forecasting module 204. Outputs from the spatial downscaling module 202 and the temporal forecasting module 204 are combined to provide both high spatial and high temporal (e.g., at real-time or near real-time) air temperature forecasts. The term 'downscaling,' as is customary in climate science, generally refers to going from low resolution to high resolution. For instance, in the present context, the spatial downscaling module 202 will produce urban-level, high spatial resolution air temperature maps from a multiplicity of inputs, some of which are lower resolution and others of which are higher resolution.

As will be described in detail below, system 200 first solves for the spatial resolution of the air temperature forecast via spatial downscaling module 202 using a conditional generative adversarial network (cGAN) model leveraging data from a multiplicity of data sources. The conditional generative adversarial network basically is able to take low-resolution inputs and downscale them. It is notable, however, that the conditional generative adversarial network is not temporal of nature, it only performs the above-referenced downscaling. Namely, as will be described in detail below, the conditional generative adversarial network will generate a time-series of high spatial resolution air temperature maps, but that is only because the data itself is temporal in nature. Simply put, the conditional generative adversarial network is trained to produce an urban-level air temperature map for the same timestamp as the inputs it is given.

Figure 3:
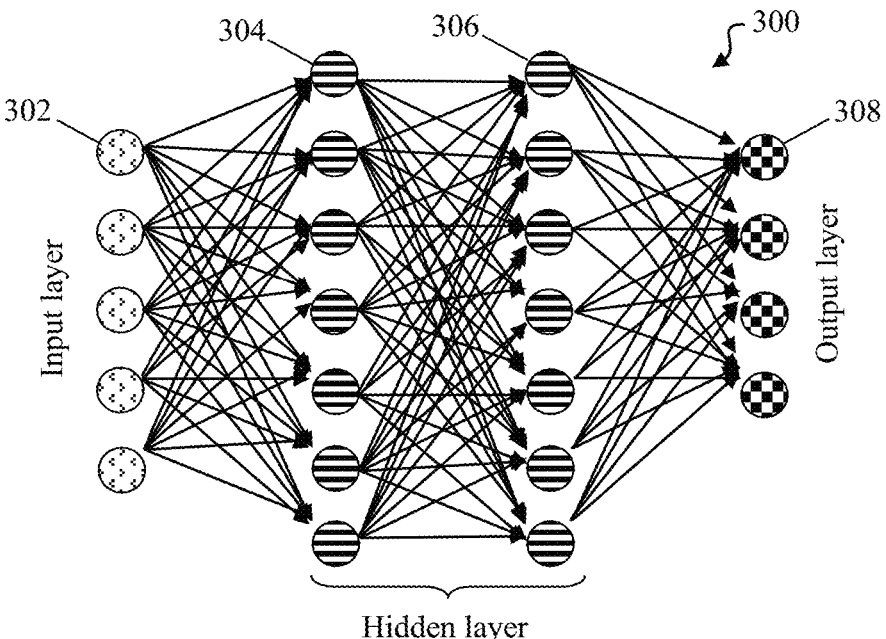
FIG. 3 is a diagram illustrating an exemplary neural network according to an embodiment of the present invention.

A generative adversarial network (or GAN for short) is a type of generative modeling that employs deep learning techniques, such as neural networks. Referring briefly to FIG. 3, an exemplary neural network 300 is provided. As shown in FIG. 3, a neural network such as neural network 300 generally includes a plurality of interconnected processor elements 302, 304/306 and 308 that form an input layer, at least one hidden layer, and an output layer, respectively, of the neural network 300. The connections in neural networks that carry electronic messages between simulated neurons are provided with numeric weights that correspond to the strength or weakness of a given connection. These numeric weights can be adjusted and tuned based on experience, making neural networks adaptive to inputs and capable of learning. Typically, neural networks are trained on labeled sets of training data. Once trained, the neural network can be used for inference. Inference applies knowledge from a trained neural network model and uses it to infer a result. A fully connected layer (typically the last or last few layers in a neural network) is a layer where all of the inputs from one layer are connected to every activation unit of the next layer. The fully connected layer(s) compile the data extracted by previous layers of the neural network to form the final output.

In particular, a generative adversarial network is an unsupervised learning model that utilizes two sub-models, i.e., a generator model and a discriminator model, along with adversarial training to output data such as an image that resembles input data to the model. Namely, during training, the generator model generates new examples (e.g., images), and the discriminator model classifies these examples as either real (i.e., from the training data) or fake (generated by the generator model). These generator and discriminator sub-models are trained together, in an adversarial manner whereby the generator model tries to come up with examples that the discriminator model misclassifies as real-meaning that the generator model is trained to generate plausible examples.

A drawback with standard generative adversarial networks is that there is little to no control over the types of example/images generated, since the generator model basically starts with random noise and continually creates images that, over time, hopefully represent the training data. Advantageously, conditional generative adversarial networks allow the model to be conditioned with additional information such as label data that helps the model learn during training.

As will be described in detail below, spatial downscaling module 202 employs a conditional generative adversarial network to generate a (historic, hourly) timeseries of high spatial resolution (e.g., urban-scale) air temperature maps at single timestamps using a multitude of (individually spatially coarse) input data sources such as global climate model, regional climate model, and urban climate model datasets, and/or any available sensor network data, which are conditioned on conditioning variables (also referred to herein as 'covariates') obtained from datasets such as satellite imagery, land cover and/or elevation datasets. These conditioning variables provide class labels for regions of the input data such as urban, vegetation or water, different terrains and/or surface temperature information, in order to better train the model for the various regions of interest. For instance, class labels that indicate urban areas such as buildings, houses or roads help the model to better estimate the air temperature in those regions during training. For the forecast horizons considered here, i.e., hours to possibly days in the future, some of the inputs that the conditional generative adversarial network leverages can be considered stationary in time, such as satellite imagery, landscape elevation, and land-use/land-cover class labels, since they do not change significantly over the course of hours or days. The other climate-related variables such as background temperature from urban climate models or regional climate models normally have similar low spatial resolution future-looking forecasts available at hourly time steps (or shorter) that vary over time.

Temporal forecasting module 204 then takes this timeseries of high spatial resolution air temperature maps from the spatial downscaling module 202 as input. It is notable that, while the output from the spatial downscaling module 202 is a timeseries, it is simply stacked outputs. It is the temporal forecasting module 204 that solves for the temporal aspect of the forecast using a physics-informed neural network. A physics-informed neural network is a neural network that incorporates physical principles into machine learning by encoding equations such as differential equations as a component of the neural network itself. It is through these differential equations that a physics-informed neural network can embed the knowledge of physical laws that are described by the differential equations, as its name implies, to enhance performance of the neural network over purely training data-driven approaches.

A physics-informed neural network can be implemented simply by adding the differential equations directly into the loss function of the neural network during training. A loss function is a function that compares target and predicted output values of the neural network in order to evaluate how well the neural network models the training data. A goal of training is to minimize this loss between the target and predicted output values. By way of example only, differential equations can be added into the loss function of a neural network by computing gradients of the neural network output with respect to its input, and then computing the residual of the differential equation using these gradients. The residual of the differential equation is added as an extra term in the loss function.

In accordance with the present techniques, temporal forecasting module 204 is enhanced by including an extended Kalman filter in the physics-informed neural network. As is generally known in the art, a Kalman filter is an algorithm that takes as input data from multiple sources (such as a sensor network in this case) and produces estimates/predictions of unknown values, in this case air temperature, even in the presence of noise. Advantageously, a Kalman filter can predict these unknown values with a higher degree of accuracy than if made using a single measurement alone. An extended Kalman filter is an extension of the Kalman filter for non-linear systems where non-linearity is approximated using the first or second order derivative.

As will be described in detail below, the temporal forecasting module 204 combines the high spatial resolution air temperature maps from the spatial downscaling module 202 with, albeit spatially sparse, real-time or near real-time air temperature measurements from a sensor network using the physics-informed neural network with embedded extended Kalman filter. As shown in FIG. 2, the result is a real-time or near real-time air temperature forecast with a fine (e.g., urban scale) spatial resolution.

Figure 4:
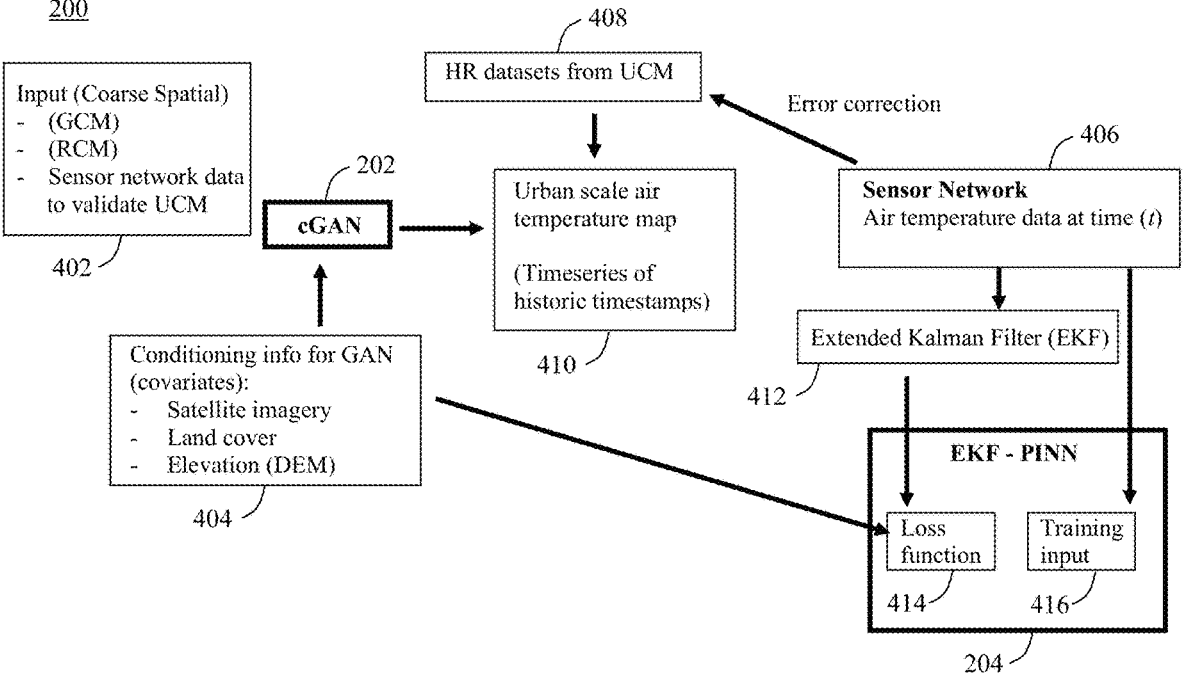
FIG. 4 is a diagram giving a detailed view of the present high resolution, real-time air temperature forecasting system according to an embodiment of the present invention.

A detailed view of system 200 is given in FIG. 4. As highlighted above, system 200 is defined in two aspects, i.e., spatial and temporal, by the spatial downscaling module 202 and the temporal forecasting module 204, respectively. As shown in FIG. 4, from a spatial standpoint, spatial downscaling module 202 uses data from a multiplicity of data sources 402 such as global climate model (GCM) forecasts, regional climate model (RCM) forecasts, and sensor network data. Climate models are computer-based representations that simulate weather patterns over time. As their names imply, such climate models can be global or regional. For instance, global climate models cover the whole Earth, whereas regional climate models focus on specific areas. Sensor network data can be gleaned from any network of sensors (see sensor network 406) that can collect and report air temperature data. For instance, by way of example only, mobile user devices such as smart phones and smart watches can take ambient air temperature measurements. The same air temperature sensor technology is also available in other machines such as some automobiles. Users can opt in to collecting and reporting this data and current location in real-time or near real-time. Other sources for sensor data that can be part of the sensor network 406 include, but are not limited to, air temperature data obtained by weather station installations. Weather stations are facilities having equipment such as air temperature sensors for collecting atmospheric data. While sparsely located from a spatial standpoint, weather stations can collect and report their findings in real-time.

These input data sources 402 to the spatial downscaling module 202 are coarse spatially. Namely, while regional climate models provide a higher spatial resolution than global climate models, the data they provide is still considered to be spatially coarse, e.g., at a spatial resolution of 10 kilometers×10 kilometers. Sensor network data is also sparse spatially, and coverage can vary greatly depending on user movement. Notably however, while the climate models provide a historic timeseries of data that is current only up to the latest model generated, the sensor network data can be obtained in real-time or near real-time. Thus, as will be described in detail below, the sensor network data can be leveraged to validate climate model data in order to obtain more up-to-date air temperature forecasts. For instance, higher spatial resolution urban climate model (UCM) datasets 408 that are corrected using data from the sensor network 406 can be leveraged to train the generative adversarial network of spatial downscaling module 202 to generate the timeseries of high spatial resolution air temperature maps that consider all of the characteristics of urban regions, as described by the covariates. Urban climate models look at urban agglomerations, but they still only provide a spatial resolution of 100 meters×100 meters or coarser which is far lower than an urban-scale spatial resolution. However, the sensor network data can be leveraged to fill in some of the spatial 'gaps' such as in areas where reporting mobile users are present.

As shown in FIG. 4, the conditional generative adversarial network of spatial downscaling module 202 is conditioned on conditioning variables 404 obtained from satellite imagery, land cover and/or elevation datasets, in order to better train the model for the various regions of interest. For instance, among other things, satellite imagery can be used to determine the land surface temperature based, for example, on thermal infrared technology. Land cover data can help label regions of interest as urban, vegetation or water. Elevation data gleaned, for example, from digital elevation models (or DEM for short), can be used to analyze different terrains (i.e., the vertical and horizontal dimensions of a land surface). Notably, while temporally sparse, the satellite imagery, land cover and/or elevation datasets for the conditioning variables 404 are available at a high spatial resolution, e.g., 30 meters×30 meters. As will be described in detail below, this higher resolution will be leveraged during training of the conditional generative adversarial network to generate a high resolution (HR) timeseries of air temperature maps at a finer spatial resolution than the global climate model, regional climate model and urban climate model inputs.

Namely, the spatial downscaling module 202 takes the multitude of input data 402 and uses the generative adversarial network conditioned on these conditioning variables 404 to produce a high resolution timeseries of air temperature maps 410 having a spatial resolution of 100 meters×100 meters or finer, i.e., an urban-scale spatial resolution. As highlighted above, data from the sensor network 406 is used to correct errors in the urban climate model datasets 408 (see 'Error correction') used for model training. Namely, climate models typically have systematic errors in their output caused, for example, by their limited spatial resolution, and which can lead to an over or under estimation of factors such as air temperature. Correcting these model errors can involve modifying observations in the timeseries. For instance, if data from the sensor network 406 indicates that an air temperature value of the latest urban climate model forecast 408 is inflated by 2° C., then 2° C. can be added to all of the historic observations of that air temperature value in the timeseries.

The high resolution timeseries of air temperature maps 410 (which remain sparse from a temporal standpoint) are then provided to the temporal forecasting module 204 which employs a physics-informed neural network with extended Kalman filter 412 to compute the temporal (real-time or near real-time) aspect of the forecast. Notably, as will be described in detail below, a thermofluidic description of the natural convective flow of heat in the atmosphere is introduced to a loss function 414 of the present physics-informed neural network as the residual of the heat equation. Doing so generalizes the system 200 to include the conservation of mass, pressure, momentum, as well as latent and sensible heat fluxes. The extended Kalman filter 412 is used to introduce data from the sensor network 406 to the training data 416 for the physics-informed neural network. This allows for the real-time incorporation of air temperature measurements with uncertainty. According to an exemplary embodiment, the extended Kalman filter 412 is embedded in the physics-informed neural network and introduces a unique term to the loss function which, as will be described in detail below, is computed by the Kalman gain and state mean. Uncertainty refers to the margin of error or noise. Namely, data from sensors in the sensor network 406 is inherently prone to noise/uncertainty due to a number of reasons including device set-up, measurement errors, data errors, etc. Given that all sensors are prone to noise, the extended Kalman filter 412 is leveraged herein to remove/mitigate the noise and uncertainty in the sensor measurements.

Figure 5:
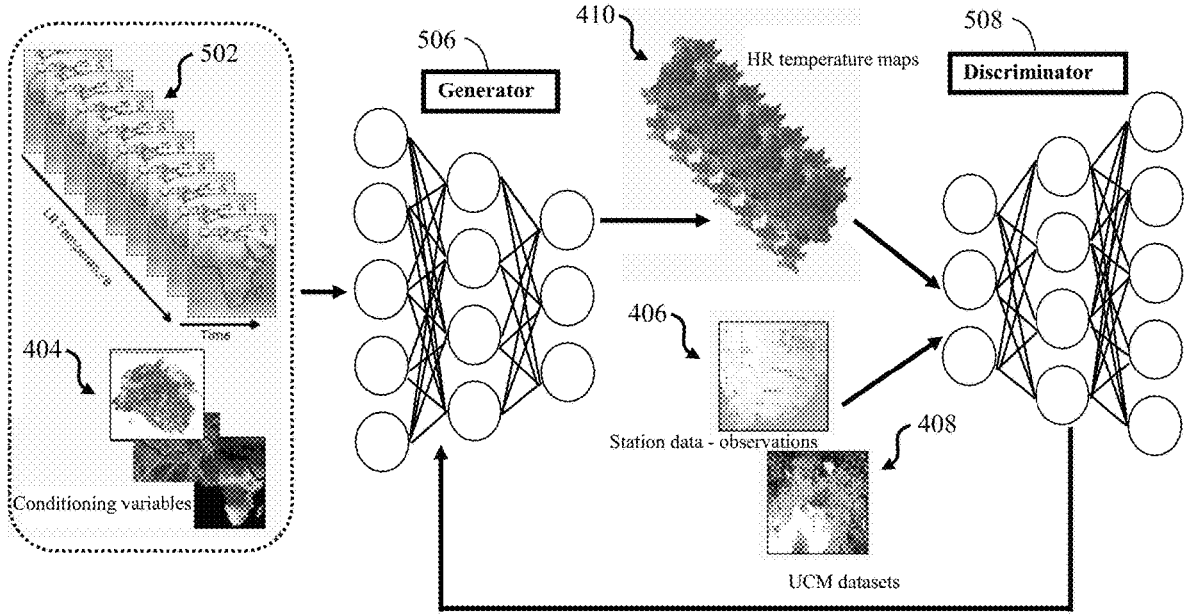
FIG. 5 is a diagram illustrating how a conditional generative adversarial network model uses a timeseries of low spatial resolution forecasts, along with high spatial resolution (but temporally sparse) conditioning variables, as input to produce high spatial resolution temperature maps according to an embodiment of the present invention.
Figure 6:
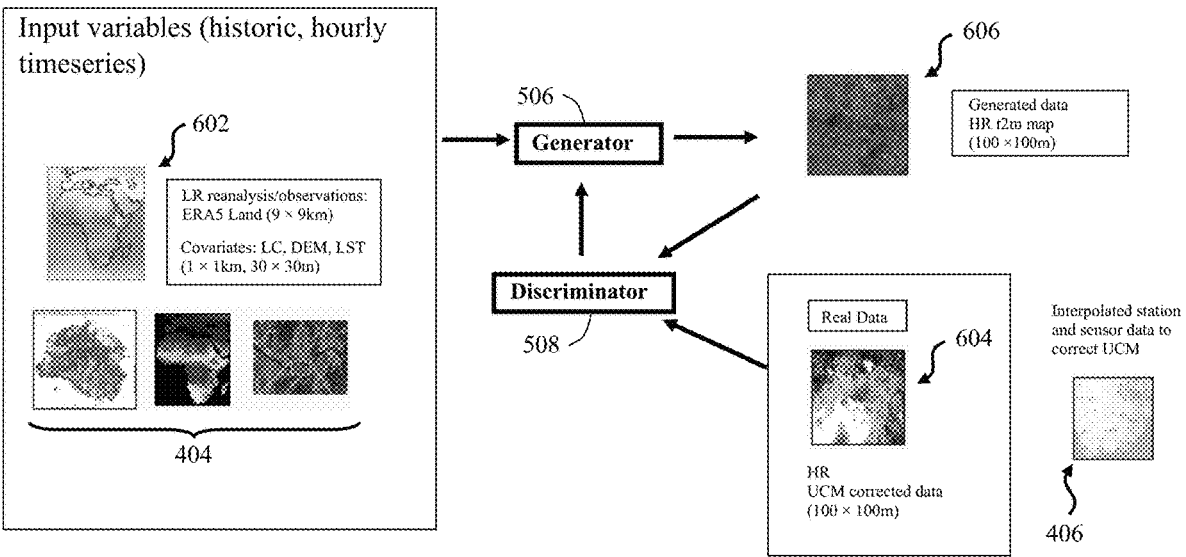
FIG. 6 is a diagram illustrating the timeseries inputs and output of the conditional generative adversarial network model according to an embodiment of the present invention.

Further details of the spatial downscaling module 202 and training of the conditional generative adversarial network are now provided by way of reference to FIGS. 5 and 6. Specifically, referring to FIG. 5, it is shown that in order to solve for the spatial component of system 200, the spatial downscaling module 202 provides a forecast dataset 502 of low spatial resolution images, e.g., from the multiplicity of data sources 402 global climate model forecasts and/or regional climate model forecasts (see above) and conditioning variables 404 (see above) as input to the Generator sub-model 506 of the associated conditional generative adversarial network. As provided above, the conditioning variables 404 are obtained from datasets such as satellite imagery, land cover and/or elevation datasets that, while temporally sparse, are available at a high spatial resolution, e.g., 30 meters×30 meters. This higher resolution input trains the Generator sub-model 506 to generate the high resolution (HR) air temperature maps 410 which are at a higher spatial resolution (e.g., 100 meters×100 meters or finer) than any of the input timeseries in the forecast dataset 502.

Further, as shown in FIG. 5, according to an exemplary embodiment the HR air temperature maps 410 are then fed into the Discriminator sub-model 508 along with urban climate model datasets 408 that, as described above, are corrected using data from the sensor network 406, in order to better train the conditional generative adversarial network. In this particular example, the sensor network 406 provides real-time weather station data. However, any of the sensor network 406 data sources described herein (including those from mobile devices, automobiles, etc.) can be implemented in the same manner.

This process of training the conditional generative adversarial network is also illustrated in FIG. 6. As will be described in detail below, the spatial resolution of the spatial downscaling module 202 will be resolved through re-gridding the input variables. As shown in FIG. 6, during training and testing of the conditional generative adversarial network, low-resolution observation datasets 602 (such as ERA5 land reanalysis temperature datasets having a spatial resolution of 9 kilometers×9 kilometers) and conditioning variables 404 (such as satellite imagery for land surface temperature, digital elevation models and/or land cover datasets which are used as conditioning information) are provided as input to the Generator sub-model 506. These conditioning variables 404 are of varying spatial resolution, and will be re-gridded accordingly.

As described in conjunction with the description of FIGS. 4 and 5 above, during inference the spatial downscaling module 202 employs low-resolution inputs from datasets such as global climate model forecasts and/or regional climate model forecasts (see, e.g., multiplicity of data sources 402 in FIG. 4) with varying spatial resolutions. The present conditional generative adversarial network architecture will account for the difference in spatial resolution between the input variables and the conditioning variables 404 by re-gridding these input variables.

As also shown in FIG. 6, urban climate model 604 datasets that are corrected using data from the sensor network 406 (e.g., data from mobile device sensors, weather station data, etc.) can be interpolated to a spatial resolution of 100 meters×100 meters. The generated high resolution temperature maps, produced by the Generator sub-model 506 would then be of a comparable spatial resolution to the corrected urban climate model datasets 604 (100 meters× 100 meters), which serve as input to the Discriminator sub-model 508.

Figure 7:
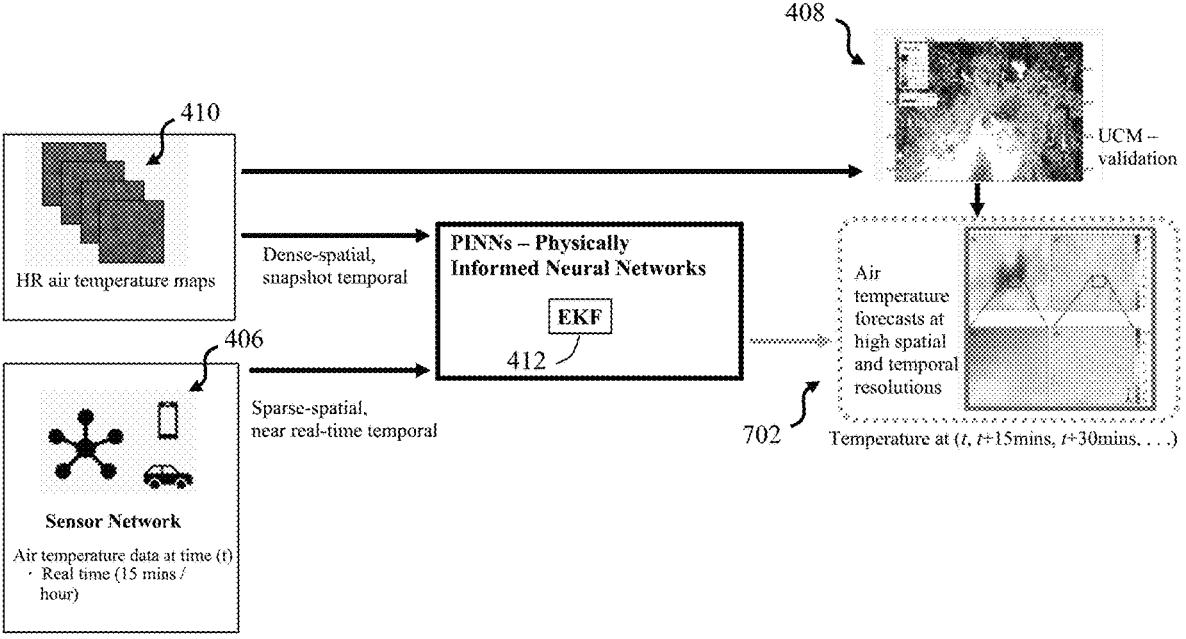
FIG. 7 is a diagram illustrating the high spatial resolution temperature maps being provided as input to a physics-informed neural network with extended Kalman filter, along with real-time sensor data according to an embodiment of the present invention.
Figure 8:
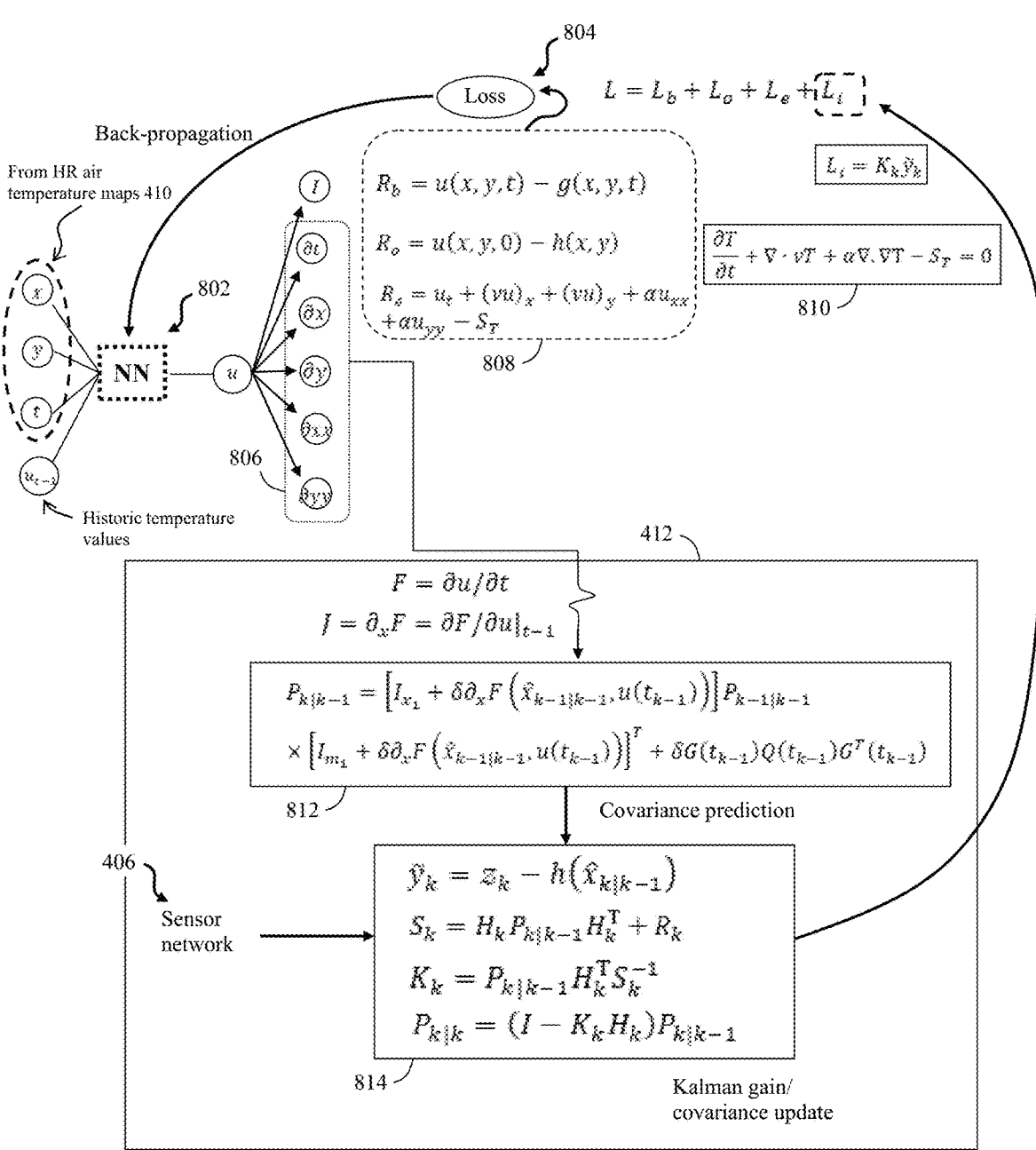
FIG. 8 is a diagram detailing the construction of the present physics-informed neural network with extended Kalman filter according to an embodiment of the present invention.

Further details of the temporal forecasting module 204 and associated physics-informed neural network with extended Kalman filter are now provided by way of reference to FIGS. 7 and 8. As shown in FIG. 7, the process then moves to the temporal forecasting module 204, where the HR air temperature maps 410 from the spatial downscaling module 202 along with real-time sensor data obtained from the sensor network 406 are provided as input to the physics-informed neural network with extended Kalman filter 412. More specifically, the HR air temperature maps 410 from the spatial downscaling module 202 are provided as input to the physics-informed neural network, and the real-time sensor data obtained from the sensor network 406 is fed to the extended Kalman filter 412. As described in detail above, the HR air temperature maps 410 are dense spatially (e.g., the HR air temperature maps 410 have a spatial resolution of 100 meters×100 meters or finer), but only provide a snapshot from a temporal standpoint. On the other hand, the sensor data from the sensor network 406 is sparse spatially, but at real-time or near real-time from a temporal standpoint. For instance, the notation '15 mins/hour' used in FIG. 7 indicates the temporal scale of the sensor network measurements according to an exemplary, non-limiting example. Namely, since the sensor network 406 is a network of multiple devices, the measurements occur at varying times. Thus, in this case, some components of the sensor network 406 can be used to obtain data at 15 minute intervals (i.e., the closest real-time measurements), while others are at an hourly interval. The physics-informed neural network with extended Kalman filter 412 will leverage the sensor data from the sensor network 406 to resolve the HR air temperature maps 410 in the temporal domain to produce air temperature forecasts 702 that are at a high spatial resolution (e.g., at a spatial resolution of 100 meters×100 meters or finer) and a high temporal resolution (e.g., at real-time or near real-time).

As also shown in FIG. 7, the urban climate model datasets 408 may also be leveraged at this stage of the process, in this case to validate the air temperature forecasts 702. Namely, according to an exemplary embodiment, the most recent one of the urban climate model datasets 408 corrected on sensor data from the sensor network 406 can be used to make sure that the output from the physics-informed neural network with extended Kalman filter 412 is correct.

Thus, the urban climate model datasets 408 are used in both the spatial and temporal resolution steps. Specifically, as provided above, in the conditional generative adversarial network (spatial step) the sensor data (e.g., mobile sensors, weather station data, etc.) from the sensor network 406 is used to correct the urban climate model datasets 408 which is used in the Discriminator sub-model 508. According to an exemplary embodiment, doing so involves interpolating the sensor data from the sensor network 406 to a (spatial) resolution of that of the urban climate model datasets 408, and then making any corrections. For instance, statistical interpolation techniques such as bilinear and bicubic interpolation or even re-gridding between datasets such as the urban climate model datasets 408 and the sensor data from the sensor network 406 produce datasets at the same spatial resolution, which makes them comparable. For example, if the sensor data from the sensor network 406 is interpolated to capture an entire scene/region and then re-gridded to the same resolution as the urban climate model datasets 408, then the sensor data from the sensor network 406 can be used to correct the urban climate model datasets 408 produced. In the physics-informed neural network (temporal step), the sensor data from the sensor network 406 is input to the physics-informed neural network through the extended Kalman filter 412 which accounts for noise and uncertainty within the sensor network 406 sensor data.

The urban climate model datasets 408 are then used to validate the air temperature forecasts 702 of the conditional generative adversarial network combined with the physics-informed neural network (see 'Air temperature forecasts at high spatial and temporal resolutions') during the development phase. According to an exemplary embodiment, a standard machine learning training paradigm using separate train and test/validate datasets is followed. For instance, by way of example only, 5 years of historic urban climate model data (e.g., from years 2015-2020) can be set aside to validate the outputs of system 200 which has been applied to unseen timestamps.

The detailed construction of the physics-informed neural network with extended Kalman filter 412 is shown illustrated in FIG. 8. According to an exemplary embodiment, the present physics-informed neural network is implemented by structuring the loss function thereof (see above) to adhere to physics principles by restricting the data to abide by the laws of physics. As will be described in detail below, an adapted heat equation will be used that embodies the convective diffusive flow of air into the atmosphere.

For instance, referring to FIG. 8 the present physics-informed neural network employs a fully-connected neural network 802 that is used to approximate a solution u(x,y,t) based on the HR air temperature maps 410 from the spatial downscaling module 202 (which have spatial coordinates x and y, and temporal coordinate t) and historic temperature values $u_{t-1}$. The historic temperature values $u_{t-1}$ are from the HR air temperature maps 410 (output from the conditional generative adversarial network) as well as the sensor data measurements from the sensor network 406. Each historic (t−1) temperature (HR air temperature maps 410 or sensor data measurements from the sensor network 406) has a value for u, and associated x, y, and t (spatial and time coordinates) components which are required input for the physics-informed neural network. According to an exemplary embodiment, a loss function 804 of the fully-connected neural network 802 computes loss (L) as:

$$L = L_b + L_o + L_e + L_i, \tag{1}$$

where $L_e$ is the residual loss, $L_b$ is the boundary condition loss, $L_o$ is the initial condition loss, and $L_i$ is an innovation loss term defined by the state mean and Kalman gain $K_k$ in the extended Kalman filter 412, i.e., $$I = K_k \hat{y}. \tag{2}$$

Namely, the innovation loss term $L_i$ constitutes the state mean and Kalman gain which are used to update predictions. This can be seen as a measure of the difference/error between the predicted and measured air temperature values (sensor data measurements from the sensor network 406). Both the Kalman gain and state mean are updated as the extended Kalman filter 412 makes predictions and receives updated sensor data measurements from the sensor network 406 during training. The $L_i$ term in the loss function updates the weights of the associated input variables and, in doing so, provides an update/correction for the air temperature predictions. In one exemplary embodiment, the parameters of the fully-connected neural network 802 are trained with a gradient-descent approach based on back propagation of the loss function 804.

The fully-connected neural network 802 makes predictions of air temperature u. The derivatives 806 of u are computed by automatic differentiation. As shown in inset 808, the derivatives 806 of u are used to resolve the boundary condition $R_b$, the initial condition $R_o$ and residual $R_e$ as:

$$R_b = u(x, y, t) - g(x, y, t)$$
$$R_o = u(x, y, 0) - h(x, y)$$
$$R_e = u_t + (vu)_x + (vu)_y + \alpha u_{xx} + \alpha u_{yy} - S_T.$$

As shown in inset 810, a thermofluidic description of the convective diffusive flow of air into the atmosphere is introduced to the loss function 804 of the fully-connected neural network 802 as the residual of the heat equation:

$$\frac{\partial T}{\partial t} + \nabla \cdot vT + \alpha \nabla \cdot \nabla T - S_T = 0, \tag{3}$$

where T is temperature, and v is the velocity with which a quantity (in this case air) is moving. Equation 3 is a more generalized heat equation being proposed herein for the physics-informed neural network. It is the same as the equation for $R_e$ (shown immediately above Equation 3), specifically written in conservative flux form. Equation 3 generalizes system 200 to include the conservation of mass, pressure, momentum, as well as latent and sensible heat fluxes following a ThermoFluid approach representing the natural convective flow of heat in the atmosphere. In addition, this heat Equation 3 generalizes system 200 spatially beyond a one-dimensional (1D) case to a two-dimensional (2D) case which is more representative for high resolution air temperature forecasts in climate applications.

As highlighted above, the extended Kalman filter 412 is the extended version of the Kalman filter and is specifically used to extend the Kalman filter to handle non-linear systems by linearizing the non-linear system. Fundamentally, the Kalman filter and/or extended Kalman filter is used for state estimation and can be used to correct sensor data by removing noise/errors from the sensor data measurements from the sensor network 406. Specifically, in the present example, the extended Kalman filter 412 takes (air temperature) sensor data input from the sensor network 406 and makes predictions on those temperature values based on the historic temperature values (see above) and also corrects any errors it detects. The discrete-time equations for the extended Kalman filter 412 are provided in insets 812 and 814, which are directed to the covariance prediction and update/correction steps, respectively, that extended Kalman filter 412 uses for estimating state. For instance, as shown in inset 812 the covariance prediction $P_{k|k-1}$ is computed as:

$$P_{k|k-1} = \left[I_{x_1} + \delta\partial_x F(\hat{x}_{k-1|k-1}, u(t_{k-1}))\right]P_{k-1|k-1} \times$$
$$\left[I_{m_1} + \delta\partial_x F(\hat{x}_{k-1|k-1}, u(t_{k-1}))\right]^T + \delta G(t_{k-1})Q(t_{k-1})G^T(t_{k-1}).$$

As shown in inset 814, the extended Kalman filter 412 computes the Kalman gain which is a covariance matrix within the system based on data from the sensor network 406 and the covariance prediction $P_{k|k-1}$, i.e., $$\tilde{y}_k = z_k - h(\hat{x}_{k|k-1}) \text{ (residual)}$$
$$S_k = H_k P_{k|k-1} H_k^T + R_k \text{ (covariance)}$$
$$K_k = P_{k|k-1} H_k^T S_k^{-1} \text{ (optimal Kalman gain)}$$
$$P_{k|k} = (I - K_k H_k) P_{k|k-1} \text{ (covariance update)}$$

Thus, the covariance prediction $P_{k|k-1}$ for the extended Kalman filter 412 will be informed by the derivatives 806 of u from the (physics-informed) fully-connected neural network 802 to provide the covariance matrix (see inset 814). Thus, as highlighted above, the computed Kalman gain can be included in the loss function 804 as an innovation term along with the state mean. Namely, $L_i$ is the innovation term introduced into the loss function. It is described by the state mean (innovation vector) and the Kalman gain computed from the extended Kalman filter 412 state update step. As data enters the physics-informed neural network and is back-propagated, these terms are updated.

The following details the prediction and update/correction steps of the Kalman filter 412 including how the innovation loss term $L_i$ is computed according to an exemplary embodiment. For the prediction step (Step 1), a state transition model:

$$x_k = f(x_{k-1}) + w_{k-1} \tag{4}$$

is used, where $x_k$ is the current state at time $t_k$, which is some function $f$ of $x_{k-1}$, the previous state at time $t_{k-1}$, and $w_{k-1}$ is the noise. An observation model:

$$z_k = h(x_k) + v_k \tag{5}$$

is employed which uses the sensor data input from the sensor network 406, where $z_k$, the current sensor measurement, is some function h of $x_k$, and $v_k$ is the noise. It is assumed that all terms added at the end are noise. The following state prediction:

$$\hat{x}_{k|k-1} = F \cdot \hat{x}_{k-1|k-1} + B_k \cdot U_k \tag{6}$$

is employed, where F is the state transition matrix, and Bk is the input matrix. The covariance matrix:

$$P_{k|k-1} = F \cdot P_{k-1|k-1} \cdot F^T + Q \tag{7}$$

is employed, where Q is the covariance matrix of the process noise.

For the update/correction step (Step 2), the innovation vector (i.e., state mean $\tilde{y}_k$) is computed as:

$$\tilde{y}_k = z_k - h(\hat{x}_k), \tag{8}$$

where $H_k$ is the Jacobian matric of the expected measurements. The state vector update is:

$$\hat{x}_{k|k} = \hat{x}_{k|k-1} + K_k \cdot \tilde{y}_k, \tag{9}$$

where $K_k$ is the Kalman gain which, as provided above, is calculated as:

$$K_k = P_{k|k-1} \cdot H_k^T \cdot S_k^{-1}. \tag{10}$$

The innovation loss term $L_i$ may then be computed as:

$$L_i = K_k \cdot \tilde{y}_{k_k}. \tag{11}$$

As also provided above, the covariance (update) matrix is:

$$P_{k|k} = (I - K_k H_k) P_{k|k-1}, \tag{12}$$

where I is an identity matrix.

It is notable that, while the present example involves the spatial coordinates x and y, the present techniques can easily be applied to other cases, included 1-dimensional (1-D) scenarios where, e.g., a heat source is located only at the ground surface and heat moves only up vertically. In that case, a simplified heat equation such as $u_t = au_{xx}$ can instead be employed.

FIG. 9 is a diagram illustrating an exemplary methodology 900 for generating air temperature forecasts using the present high resolution, real-time air temperature forecasting system 200. In step 902, air temperature data from a multiplicity of sources is provided as input to the conditional generative adversarial network of spatial downscaling module 202 (having Generator sub-model 506 and Discriminator sub-model 508). As described in detail above, during training and testing of the conditional generative adversarial network the multiplicity of sources can include low-resolution observation datasets (such as ERA5 land reanalysis temperature datasets having a spatial resolution of 9 kilometers×9 kilometers). By comparison, during inference the multiplicity of sources can include low-resolution inputs from datasets such as global climate model forecasts and/or regional climate model forecasts with varying spatial resolutions.

In step 904, the input to the conditional generative adversarial network is conditioned on at least one conditioning variable. For instance, as provided above, suitable conditioning variables (for training/testing and inference) include, but are not limited to, satellite imagery for land surface temperature, digital elevation models and/or land cover datasets. Such conditioning variables are of varying spatial resolution, and will be re-gridded accordingly.

In step 906, high resolution air temperature maps having a spatial resolution of 100 meters×100 meters or finer (e.g., high resolution timeseries of air temperature maps 410) are generated as output from the conditional generative adversarial network. As described in detail above, the output from the Generator sub-model 506 of the conditional generative adversarial network needs to be at the same spatial resolution as this ground-truth/real data. As such, (corrected) urban climate model datasets can be employed as input to the Discriminator sub-model 508 of the conditional generative adversarial network to update the Generator sub-model 506.

In step 908, the high resolution air temperature maps from step 906 along with real-time sensor data measurements from the sensor network 406 are provided as input to the physics-informed neural network and extended Kalman filter 412, respectively, of temporal forecasting module 204. In step 910, high temporal and spatial resolution air temperature forecasts (e.g., air temperature forecasts 702) are generated as output from the physics-informed neural network and extended Kalman filter 412. According to an exemplary embodiment, the high temporal and spatial resolution air temperature forecasts generated in step 910 are generated at a real-time (t) or a near real-time (e.g., a delay in the real-time (t) of less than about 15 minutes).

Figure 10:
FIG. 10 is an example of the present high resolution, real-time air temperature forecasting system being implemented for two-dimensional (2D) high resolution air temperature forecasts according to an embodiment of the present invention.

The present techniques are now further described by way of reference to the following non-limiting example. As described above, the generalized heat Equation 3 used in accordance with the present high resolution, real-time air temperature forecasting system 200 generalizes the current approach spatially beyond a one-dimensional (1D) case to two-dimensional (2D) applications. Such capabilities advantageously make system 200 more useful for high resolution air temperature forecasts in climate applications such as that shown illustrated in FIG. 10. As shown in FIG. 10, the conditional generative adversarial network (CGAN) of spatial downscaling module 202 generates a high spatial resolution air temperature map (i.e., at the granularity of a particular urban structure) using historical (i.e., past) air temperature data from a multiplicity of sources (see above). Available urban climate model (UCM) datasets corrected on sensor measurements from a sensor network (sensor data) are used to update the CGAN as described above, thereby enabling the CGAN and physics-informed neural network to make future air temperature predictions in 2-D across the region containing the urban structure.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A computer system comprising:
a processor set;
one or more computer readable storage media; and
program instructions stored on the one or more computer readable storage media to cause the processor set to perform operations comprising:
    providing air temperature data from a multiplicity of sources as a first input to a generative adversarial network;
    conditioning the first input to the generative adversarial network on at least one conditioning variable;
    training the generative adversarial network with the air temperature data and the conditioning the first input to the generative adversarial network on the at least one conditioning variable;
    generating high resolution air temperature maps as a first output from the generative adversarial network, wherein the high resolution air temperature maps are generated at a higher spatial resolution than the air temperature data from the multiplicity of sources;
    providing the high resolution air temperature maps along with real-time air temperature data from a sensor network as a second input to a physics-informed neural network with extended Kalman filter; and
    generating high temporal and spatial resolution air temperature forecasts as a second output from the physics-informed neural network with the extended Kalman filter.

2. The computer system of claim 1, wherein the high resolution air temperature maps have a spatial resolution of 100 meters×100 meters or finer.

3. The computer system of claim 1, wherein the multiplicity of sources is selected from a group consisting of: global climate model forecasts, regional climate model forecasts, and urban climate model datasets.

4. The computer system of claim 1, wherein the first input to the generative adversarial network comprises a first timeseries of the air temperature data from the multiplicity of sources, and wherein the first output from the generative adversarial network comprises a second timeseries of the high resolution air temperature maps.

5. The computer system of claim 1, wherein the at least one conditioning variable is obtained from a dataset selected from a group consisting of: a satellite imagery dataset, a land cover dataset, and an elevation dataset.

6. The computer system of claim 1, wherein the operations further comprise:

generating the high resolution air temperature maps; and feeding the high resolution air temperature maps to a discriminator sub-model along with urban climate model datasets corrected using the real-time air temperature data from the sensor network.

7. The computer system of claim 6, wherein the urban climate model datasets have a spatial resolution of 100 meters×100 meters or coarser.

8. The computer system of claim 1, wherein the high temporal and spatial resolution air temperature forecasts are generated at a real-time (t) or a near real-time, wherein the near real-time comprises a delay in the real-time (t) of less than about 15 minutes.

9. The computer system of claim 1, wherein the high temporal and spatial resolution air temperature forecasts are generated at a spatial resolution of 100 meters×100 meters or finer.

10. A computer system comprising:

a processor set;

one or more computer readable storage media; and program instructions stored on the one or more computer readable storage media to cause the processor set to perform operations comprising:

providing air temperature data from a multiplicity of sources as first input to a generative adversarial network;

conditioning the first input to the generative adversarial network on at least one conditioning variable;

training the generative adversarial network with the air temperature data and the conditioning the first input to the generative adversarial network on the at least one conditioning variable;

generating high resolution air temperature maps having a spatial resolution of 100 meters×100 meters or finer as a first output from the generative adversarial network, wherein the high resolution air temperature maps are generated at a higher spatial resolution than the air temperature data from the multiplicity of sources;

providing the high resolution air temperature maps along with real-time air temperature data from a sensor network as a second input to a physics-informed neural network with extended Kalman filter; and generating high temporal and spatial resolution air temperature forecasts as a second output from the physics-informed neural network with the extended Kalman filter, wherein a loss function of the physics-informed neural network computes loss L as $L=L_b+L_o+L_e+L_i$, wherein $L_e$ is a residual loss, $L_b$ is a boundary condition loss, $L_o$ is an initial condition loss, and $L_i$ is a loss term defined by an innovation vector and Kalman gain in the extended Kalman filter.

11. The computer system of claim 10, wherein the multiplicity of sources is selected from a first group consisting of: global climate model forecasts, regional climate model forecasts, urban climate model datasets, and combinations thereof, and wherein the at least one conditioning variable is obtained from a dataset selected from a second group consisting of: a satellite imagery dataset, a land cover dataset, and an elevation dataset.

12. The computer system of claim 10, wherein the high temporal and spatial resolution air temperature forecasts are generated at a real-time (t) or a near real-time, wherein the near real-time comprises a delay in the real-time (t) of less than about 15 minutes.

13. The computer system of claim 10, wherein the high temporal and spatial resolution air temperature forecasts are generated at the spatial resolution of 100 meters×100 meters or finer.

14. A method for generating air temperature forecasts, the method comprising:

providing air temperature data from a multiplicity of sources as a first input to a generative adversarial network;

conditioning the first input to the generative adversarial network on at least one conditioning variable;

training the generative adversarial network with the air temperature data and the conditioning the first input to the generative adversarial network on the at least one conditioning variable;

generating high resolution air temperature maps having a spatial resolution of 100 meters×100 meters or finer as a first output from the generative adversarial network, wherein the high resolution air temperature maps are generated at a higher spatial resolution than the air temperature data from the multiplicity of sources;

providing the high resolution air temperature maps along with real-time air temperature data from a sensor network as a second input to a physics-informed neural network with extended Kalman filter; and generating high temporal and spatial resolution air temperature forecasts as a second output from the physics-informed neural network with the extended Kalman filter, wherein a loss function of the physics-informed neural network computes loss L as $L=L_b+L_o+L_e+L_i$, wherein $L_e$ is a residual loss, $L_b$ is a boundary condition loss, $L_o$ is an initial condition loss, and $L_i$ is a loss term defined by an innovation vector and Kalman gain in the extended Kalman filter.

15. The method of claim 14, wherein the multiplicity of sources is selected from a first group consisting of: global climate model forecasts, regional climate model forecasts, urban climate model datasets, and combinations thereof, and wherein the at least one conditioning variable is obtained from a dataset selected from a second group consisting of: a satellite imagery dataset, a land cover dataset, and an elevation dataset.

16. The method of claim 14, wherein the first input to the generative adversarial network comprises a first timeseries of the air temperature data from the multiplicity of sources, and wherein the first output from the generative adversarial network comprises a second timeseries of the high resolution air temperature maps.

17. The method of claim 14, further comprising:

generating the high resolution air temperature maps using a generator sub-model; and feeding the high resolution air temperature maps to a discriminator sub-model along with urban climate model datasets having the spatial resolution of 100 meters×100 meters or coarser which are corrected using the real-time air temperature data from the sensor network.

18. The method of claim 14, wherein the high temporal and spatial resolution air temperature forecasts are generated at a real-time (t) or a near real-time, wherein the near real-time comprises a delay in the real-time (t) of less than about 15 minutes.

19. The method of claim 14, wherein the high temporal and spatial resolution air temperature forecasts are generated at the spatial resolution of 100 meters×100 meters or finer.

* * * * *